May 1, 1962     H. W. ROEBER     3,032,208
GRID TRANSFER MECHANISM

Filed Aug. 13, 1958     2 Sheets-Sheet 1

INVENTOR
HENRY W. ROEBER

BY *Michael Hertz,*
ATTORNEY

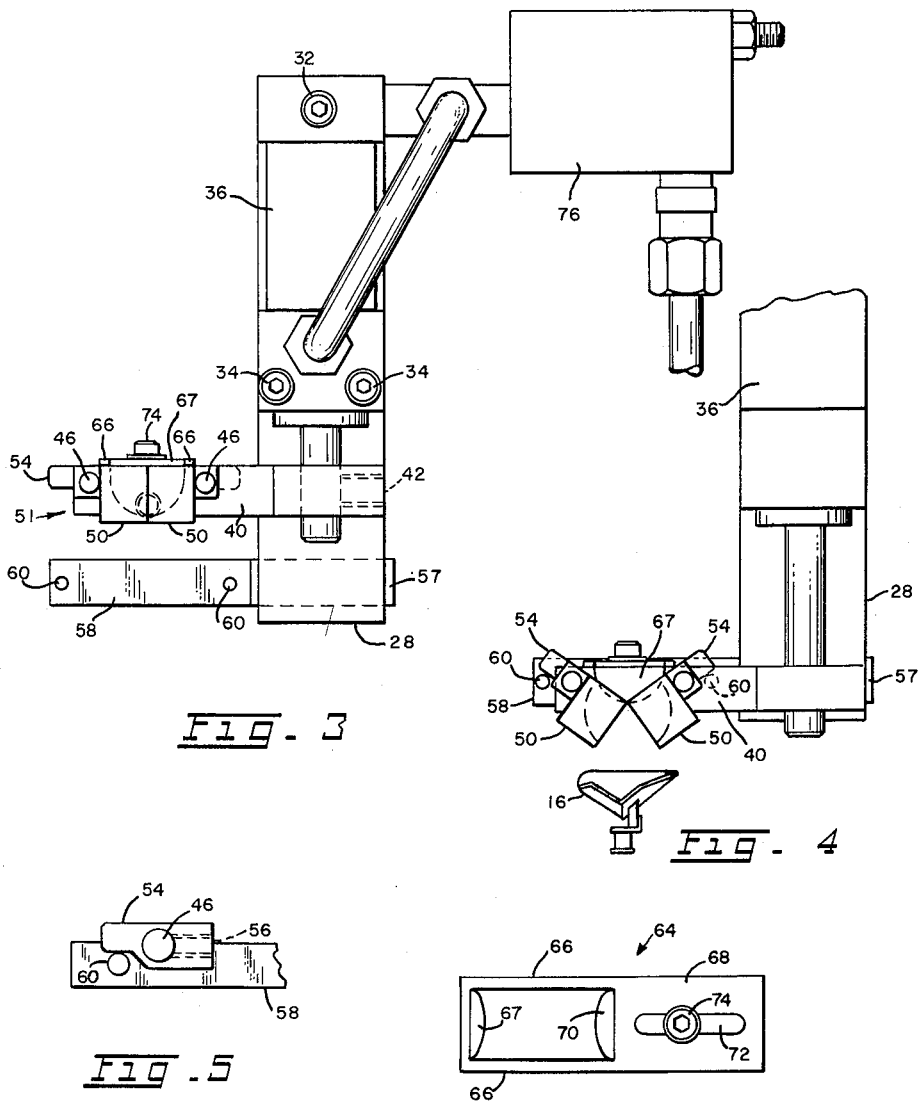

3,032,208
GRID TRANSFER MECHANISM
Henry W. Roeber, Emporium, Pa., assignor, by mesne assignments, to Sylvania Electric Products Inc., Wilmington, Del., a corporation of Delaware
Filed Aug. 13, 1958, Ser. No. 754,853
4 Claims. (Cl. 214—1)

This invention relates to transfer mechanism for transferring a delicate article, as a grid, from a processing machine, to a receptacle. In particular the invention relates the transfer of a grid from a grid stretcher to a bucket conveyor. The transfer mechanism herein is an improvement on the form of transfer device disclosed in the Stanley J. Gartner, Roy J. Leap and Gerald F. Sanker for Grid Stretcher filed July 17, 1958, and bearing Serial Number 749,101, now Patent No. 3,010,490 to which reference may be made for further particulars as to the stretcher and bucket conveyor.

In transferring grids from the grid stretcher to the pivoted bucket transfer device of the previous disclosure and in the subsequent transfer to the chain conveyor bucket, it was found that there was considerable bouncing about of the grids in the transfer device and buckets as they were delivered thereto. Since the grids are frequently made of side rods with grid laterals of extremely fine wire spirally wound thereabout, this bouncing about frequently distorted the grid laterals with consequent detriment to the performance of an electron tube of which the grid formed a part.

It was to avoid this unnecessary distortion of the grid that the invention was developed.

A further consideration in the development of the invention was to provide a sturdy transfer device which would be adapted to the grid processing machine and conveyor buckets and which would transfer the grid from the processing machine to a bucket with but a small free fall of the grid.

For a fuller understanding of the invention attention is directed to the following specification taken in conjunction with the accompanying drawing in which:

FIG. 3 is a front view of the transfer mechanism with a transfer dump receptacle in its upper closed position ready to receive a stretched grid as it is stripped from the stretcher blades.

FIG. 4 is a fragmentary view showing the dump receptacle in its lower opened position to transfer a grid to the conveyor carried bucket therebelow.

FIG. 5 is a rear view of a trip finger operative in conjunction with a stop pin to effect a tilting of a bottom leaf of the dump receptacle, and FIG. 6 is a view of a rear wall carrying plate forming part of the dump receptacle.

Figure 1:
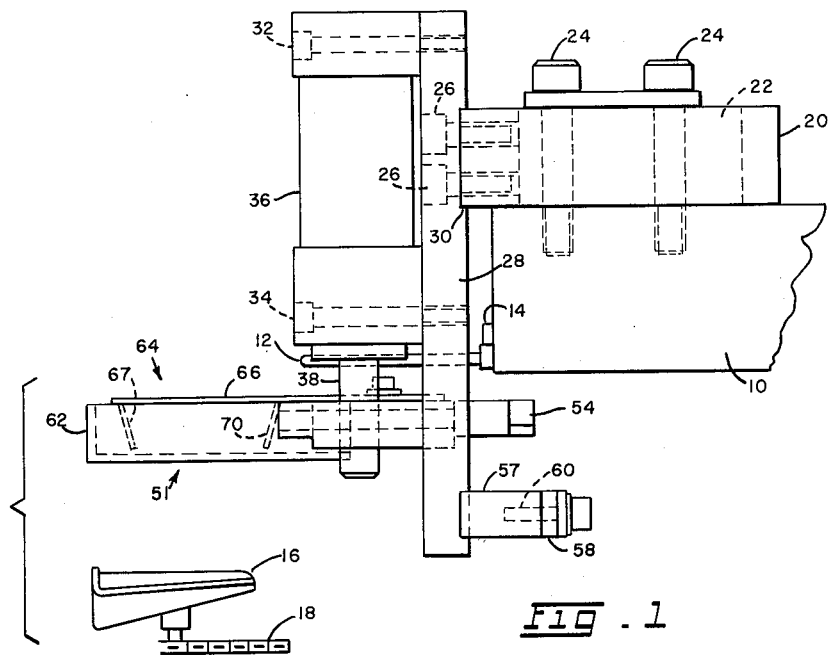
FIG. 1 is a side elevational view showing the delivery end of the previously disclosed grid stretcher together with the transfer mechanism of this invention and its relationship to the receiving buckets on the conveyor beneath the transfer mechanism.
Figure 2:
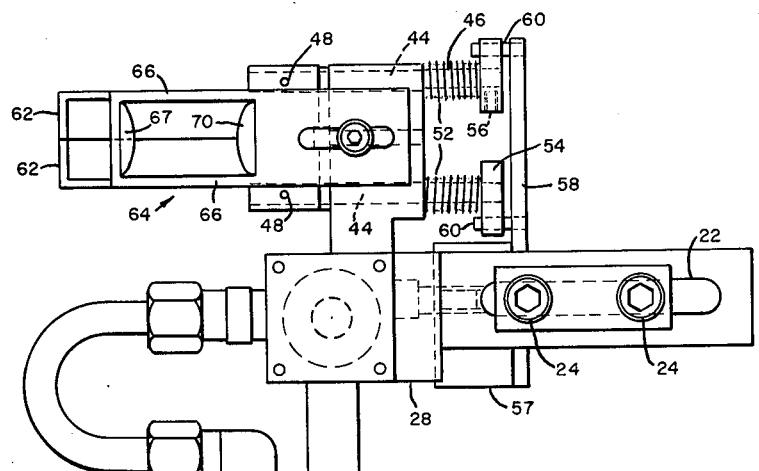
FIG. 2 is a top view of the transfer mechanism.

Now referring to the drawings in greater detail, at 10 there is disclosed the housing in which there is mechanism to move the stretcher blades apart, one of which is indicated at 12. Along the blades are reciprocatable the combined stops and strippers 14, as more fully disclosed in the previous disclosure. For the purpose of this disclosure it may be stated that after a grid, comprised of two parallel grid side rods and a grid wire spirally wound thereabout, is preliminarily manufactured on a grid winding machine, it is blown onto the stretcher blades 12, FIG. 1, of which there are two side by side in such a manner as to surround the same, the grid coming to rest against two stops 14, one adjacent each blade 12. After the blades 12 have separated from one another to stretch the grid laterals i.e. the spiral turns of wire between the grid side rods, the blades again collapse toward each other. The stops 14 then thrust the released grid longitudinally to the left, FIG. 1, and it is pushed off clear of the blades 12. To catch the grid and transport it for deposit in a bucket 16 on an indexible chain conveyor 18 there is provided the following apparatus:

Mounted on the housing 10 is a bar 20 slotted as indicated at 22 to accommodate two bolts 24 which thereby holds the bar to the housing in a desired position longitudinally of the housing. Fastened to the front of the bar by screws 26 is a vertical plate 28, the plate having a keyway 30 and having a lateral slot to provide for lateral adjustment of the plate on the bar. To the front face of the plate is fastened, as by screws 32 and 34, a double acting air motor 36 whose piston 38 carries a laterally extending block 40, fastened to the piston by conventional fastening means, as set screws 42.

The block 40 has a rear wall riding against the plate 28 to prevent rotation of the plate in a horizontal plane and further has two parallel openings 44 in which are journalled oscillatable axle rods 46 and to which are fastened, by pins 48, a pair of dump receptacle bottoms 50 forming part of a dump receptacle 51 with upwardly directed inner faces, the bottoms and faces forming quadrants of the surface of a cylinder. The bottoms are normally rotated to the closed position shown in FIG. 3 by torsion springs 52 each reacting between the block 40 and a trip finger 54 fastened to its rod 46 by a set screw 56, the spring being fastened to the block and finger at its opposite ends.

At the lower end of the vertical plate 28 is fastened thereto, by means of a block 57, a cross arm 58 in which there is mounted a pair of spaced trip pins 60 each lying in the path of movement of its companion trip finger 54, as the transfer dump receptacle descends. On continued descent of the receptacle, each finger 54 will rotate with its rod 46, tensioning the surrounding spring 52 and effecting an opening of the dump receptacle bottom to allow a grid therein to drop a small distance into the bucket 16 therebeneath.

On rise of the dump receptacle, the fingers 54 will leave the pins 60, and the springs 52 will rotate the bottom sections of the dump receptacle to their closed positions.

The dump receptacle has mating front wall quadrants 62 but no rear wall. To provide a rear wall, a plate 64 is adjustably fastened at its stub end 68 to the block 40 and has an inclined wall 70 with semicircular lower edge, the wall 70 forming the rear wall of the dump receptacle when it is closed. The wall 70 may be adjusted toward or away from the front wall quadrants 62 to just accommodate the length of the grid which is deposited in the receptacle and the rear wall is just under the ends of the stretcher blades 12. For the purpose of replaceability and for adjusting the length of the receptacle to the length of the grids, the end 68 of the plate 64 is longitudinally slotted, as indicated at 72, and a washer and screw 74 hold the plate and therefore the wall 70 in desired adjusted position. If desired, the plate 64 may be provided with legs 66 which extend parallel to the longitudinal side edges of the closed dump receptacle and with a front wall 67 integral with the legs and inclined toward the wall 70. Thus different sized grids may be guided into the receptacle as they are stripped from off the stretcher blades and into desired areas of the dump receptacle, in accordance with the length of opening between the walls 67 and 70 and position of the plate 64.

A conventional pressure reducing valve 76 admits air under regulated pressure into the respective ends of the cylinder 36 while cams on the grid forming machine (not illustrated) control the timing of the motor, stretcher blades, stripper and indexing of the chain 18. The timing is such that the dump receptacle is at its upper limit when the stripper 14 pushes a grid off the blades 12 and is at its lower limit when a bucket is stationary below the receptacle. The grids thus have but a small free fall distance in their transfer from the stretcher blades 12 to the bucket 16.

In the up position of the dump receptacle the same is very close to the stretchers 12 and the rear wall 70 is directly below the ends of the blades. The slope of the walls permits the ends of the side rods of a grid to slide down easily into the receptacle. In the down position of the receptacle, it is very close to and directly registers with the bucket 16 therebeneath. The free fall of the grid is thereby reduced to a minimum, and the grid will seat in the receptacle without bounce or disturbance of the grid wire arrangement.

What is claimed is:

1. A transfer device for transferring an article from a processing machine to a receiving receptacle comprising a reciprocable motor having a piston, a block mounted on the piston, a vertically reciprocable receptacle, bottom sections forming part of the receptacle having pivots in said block, said sections also each having a front wall section, means movable with the receptacle to effect closing of the bottom sections, a projection on each section, means fixed with reference to the movable receptacle and below the receptacle to engage the projections and open the sections, a plate adjustably mounted on the block and a section on the plate extending downwardly to form a rear wall of the receptacle when said bottom sections are closed.

2. A transfer device for transferring an article from a processing machine to a receiving receptacle comprising a reciprocable motor having a piston, a block mounted on the piston, a vertically reciprocable receptacle, bottoms sections forming part of the receptacle having pivots in said block, said sections also each having a front wall section, means movable with the receptacle to effect closing of the bottom sections, a projection on each section, means fixed with reference to the movable receptacle and below the receptacle to engage the projections and open the sections, a plate adjustably mounted on the block and a section on the plate extending downwardly and inclined toward the front wall to form an adjustable rear wall of the receptacle when said bottom sections are closed.

3. An article processing machine having a release element for the article; a receiving receptacle having a closed bottom, below the release element, to receive the released article; means for lowering the receiving receptacle with the article therein; the bottom of said receptacle having separable sections and biased operating means effecting closure of the sections; means for separating the sections comprising projections on the sections, one for each section and fixed abutments in the path of the projections operative on the descent of the receptacle to separate the bottom sections of the receptacle; and a receiver below the receptacle to catch the article released by the receptacle.

4. An article processing machine having a release element for the article; a receiving receptacle having a closed bottom, below the release element, to receive the released article; means for lowering the receiving receptacle with the article therein; pivoted bottom sections forming the bottom of said receptacle; spring means biasing said sections to receptacle bottom closing position; pivot rods on which said sections are mounted, projections extending laterally from said rods; a receiver below the receptacle in position to receive an article dumped by the receptacle; and a fixed pair of pins in the path of downward movement of the projections whereby when the projections engage the pins and move downward therealong, the bottom sections of the receptacle will be separated and the article therein will be dumped into the receiver.

References Cited in the file of this patent

UNITED STATES PATENTS

| | | |
|---|---|---|
| 1,869,457 | Benoit | Aug. 2, 1932 |
| 2,034,653 | Flaws | Mar. 17, 1936 |
| 2,583,700 | Lyon | Jan. 29, 1952 |
| 2,628,726 | Van Schie | Feb. 17, 1953 |